Sept. 9, 1969      F. T. SGANGA      3,465,453
MATHEMATICAL COMPARISON DEVICE
Filed Sept. 14, 1967      2 Sheets-Sheet 1
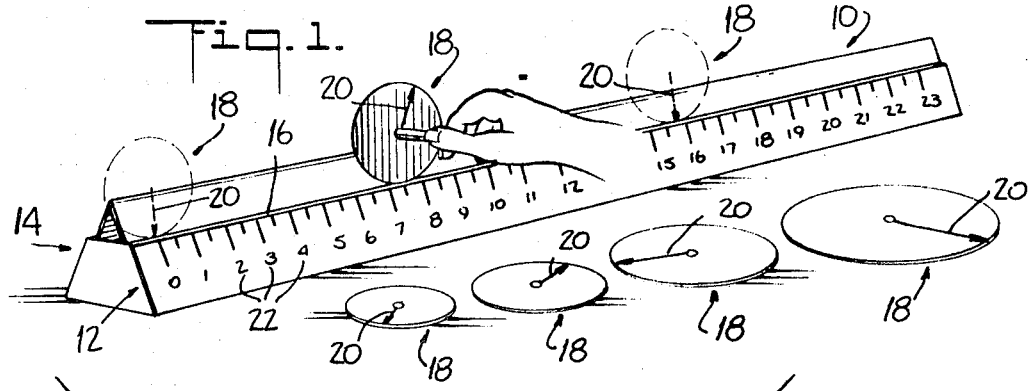
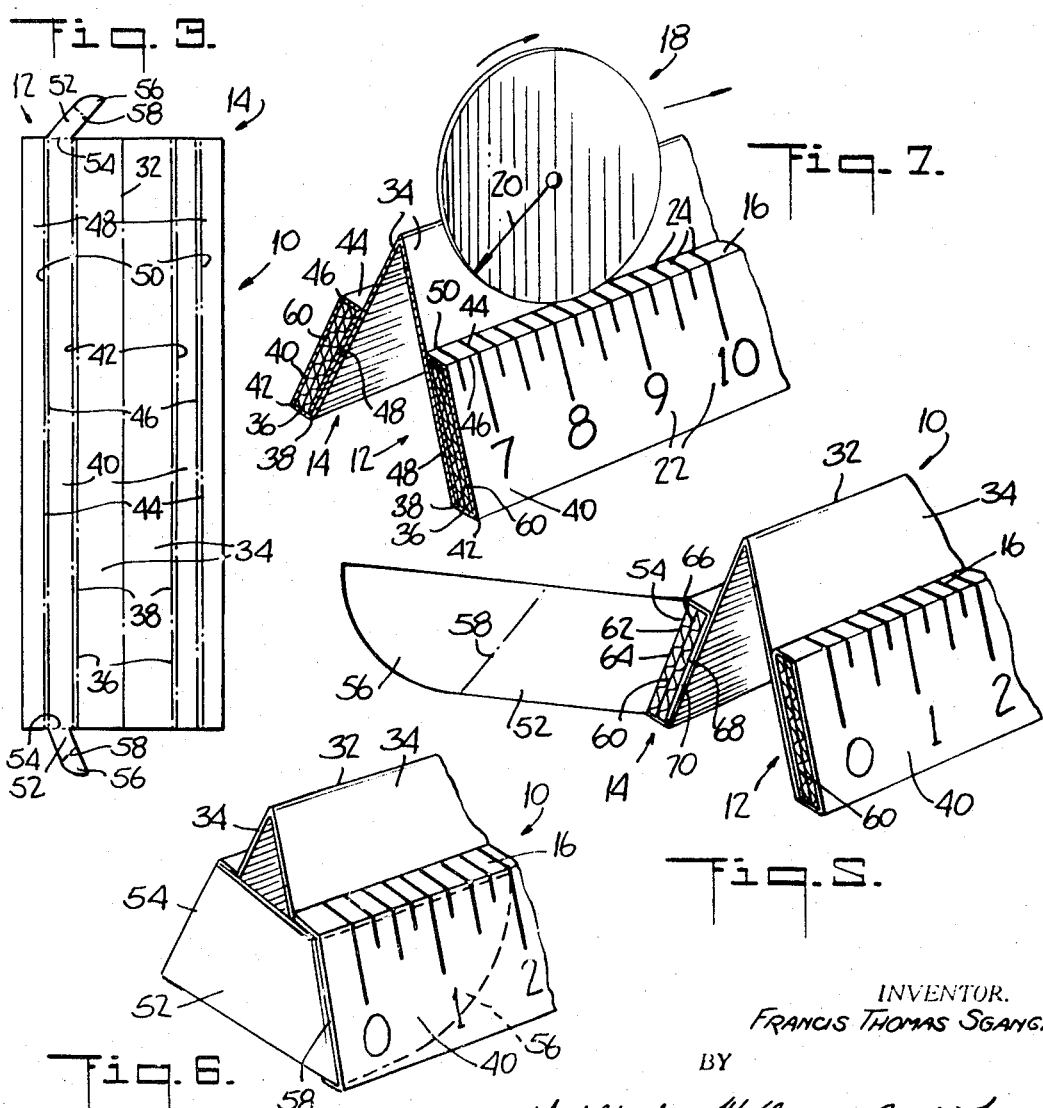
INVENTOR.
FRANCIS THOMAS SGANGA
BY
ATTORNEYS Sept. 9, 1969  F. T. SGANGA  3,465,453
MATHEMATICAL COMPARISON DEVICE
Filed Sept. 14, 1967  2 Sheets-Sheet 2
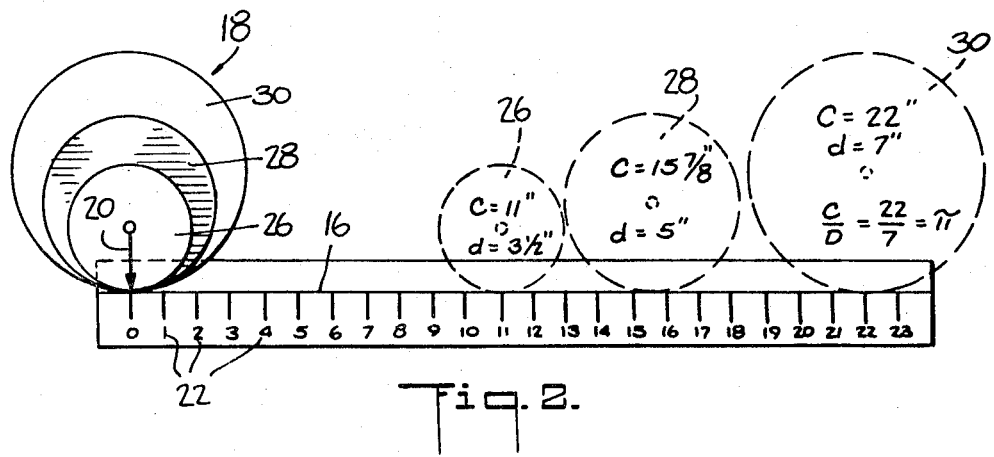
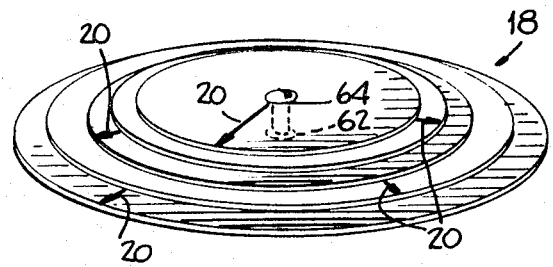
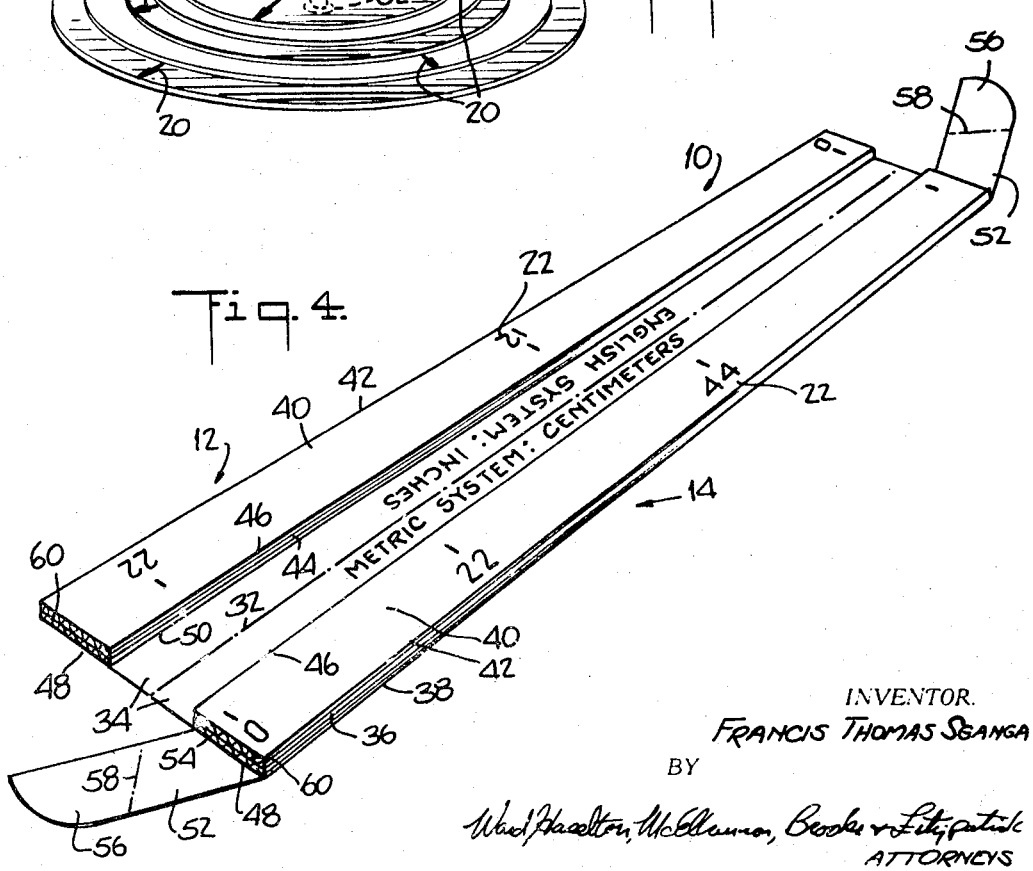
INVENTOR.
FRANCIS THOMAS SGANGA
BY
ATTORNEYS

United States Patent Office 3,465,453
Patented Sept. 9, 1969

3,465,453
MATHEMATICAL COMPARISON DEVICE
Francis Thomas Sganga, New Smyrna Beach, Fla., assignor to St. Regis Paper Company, New York, N.Y., a corporation of New York
Filed Sept. 14, 1967, Ser. No. 667,844
Int. Cl. G09b 23/04
U.S. Cl. 35—34                                     11 Claims

ABSTRACT OF THE DISCLOSURE

A device for comparing mathematical relationships using a ruler-like member which incorporates angularly extending side walls and a longitudinally extending ledge which receives discs that may be rotated therealong to indicate the circumferences thereof.

---

Our invention has to do with teaching aids and more particularly to a device for comparing mathematical relationships. The device according to the present invention is particularly adapted, along other possible uses, for illustrating to students the relationship between the radius and circumference of circles of different sizes.

It has been found in the past that it is difficult to explain to students the concept of the comparative relationship of the diameter to the circumference of a circle, and hence we have developed a visual demonstrating device that will readily show the students these relationships. Further, by way of our invention, visual demonstration is provided that makes it easy for students to understand such fundamental concepts as equivalent fractions, ratios and proportions. Also, by way of this invention, there is shown graphically how the values of pi ($\pi$) can be found experimentally by finding circumferences of circles of various sizes.

Briefly, our invention comprises a device for comparing mathematical relationships including a ruler-like member having angularly disposed side walls with a longitudinal ledge extending therealong. This ledge is for receiving discs which have indicia thereon so that they may be rotated therealong, and thereby indicate the circumference thereof. Further, according to the invention, a plurality of discs, each having preselected diameters, are employed.

In one form of our invention, the side walls below the ledge are divided into a plurality of spaces by indicia thereon. This indicia extends below the ledge as well as on the ledge itself of making it easier for the operator to visualize. It will be appreciated that the indicia on one side wall is in the English system and the indicia on the other side wall is in the metric system, thereby visually showing the students the relationship of each system to the other.

According to one embodiment of our invention, each side wall is formed by an angularly disposed inner panel and a narrow substantially horizontal bottom panel connected to the inner panel along a side edge. The side wall also includes an outer panel which is parallel to the inner panel and connected to the bottom panel along a side edge. This outer panel is of substantially less width than the inner panel so that the inner panel extends thereabove when the device is in its set-up position. A top panel is provided which extends substantially parallel to the bottom panel and is connected to the outer panel along a side edge, thereby forming a ledge on which the discs can be rotated. A tuck-in panel is foldably connected to the top panel along a side edge. This panel is disposed in face to face relationship with respect to the inner panel and the two panels are permanently adhered together. It will be appreciated that according to one feature of our invention a reinforcing sheet is interposed between the tuck-in panel and the outer panel. Further, an end panel is provided which is connected to the end edge of the front panel and a depending tuck-in tab is connected to the end edge of the end panel for tucking in adjacent the outer panel of the opposite side wall.

As another feature of our invention there is provided a new and improved teaching device which can be fabricated from a single blank of paperboard rather like semi-rigid sheet material. Also, the device may be fabricated and then shipped to the ultimate consumer in a collapsed condition so that all the user has to do is insert two flaps into position and the device is set up ready for use.

A further feature of the invention is to provide a device of this character which is of a simple and practical construction, which is neat and attractive in appearance, which is relatively inexpensive to manufacture, and which is otherwise well-suited for its intended purpose.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as a basis for the designing of outer structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a perspective view of a teaching device constructed according to the concepts of our invention;

FIG. 2 is a side elevation of the ruler-like member of FIG. 1;

FIG. 3 is a plan view of the blank for forming the teaching device of FIG. 1;

FIG. 4 is an enlarged perspective view of the device in a collapsed condition ready for shipment;

FIG. 5 is an enlarged fragmentary perspective view of the ruler showing the end construction thereof before the tuck-in tab is placed in its assembled position;

FIG. 6 is an enlarged view similar to FIG. 5, but showing the tuck-in tab in its assembled position;

FIG. 7 is an enlarged perspective view of a disc positioned on the longitudinal ledge; and FIG. 8 is a perspective view of the plurality of discs according to our invention.

In the embodiment of the invention illustrated, the ruler member, indicated generally at 10, has angularly disposed front and rear side walls indicated generally at 12 and 14, respectively. Each of these walls has a longitudinal ledge 16 extending the full length of the ruler member for receiving discs, indicated generally at 18, thereon. Each of the discs has indicia thereon such as arrow 20 so that it is readily apparent when a disc has been rotated a complete revolution along the longitudinal ledge 16. As best seen in FIGS. 1 and 7, the side walls below the ledge are divided into a plurality of spaces by indicia 22. It will be particularly noted that this indicia extends on top of the longitudinal ledge 16, as at 24, FIG. 7. As best seen in FIG. 4, the indicia on the front wall 12 is in the English system and the indicia on the rear wall 14 is in the metric system.

Referring particularly to FIG. 2, the use of the teaching device is illustrated. In order to determine the circumference of disc 26, having a diameter of 3½ inches, the disc is placed on the longitudinal ledge 16 with its arrow 20 pointing to the zero mark. Then, the disc is rotated along the edge one complete revolution until the arrow again points downwardly. As seen by the broken line in FIG. 2, the circumference is clearly 11 inches. In like manner, it may be determined that the circumference of disc 28 having a diameter of 5 inches and disc 30 having a diameter of 7 inches is 15⅞ inches and 22 inches, respectively. Further, it may be seen that the relationship of the circumference divided by the diameter is always equal to 22/7 or pi ($\pi$) regardless of the size of disc employed.

As best seen in FIG. 3, the ruler member 10 may be fabricated from a single sheet of paperboard or the like semi-rigid sheet material. The blank has a substantially centrally disposed first score line 32 for folding the blank when set up to provide corresponding opposite side wall portions indicated generally at 12 and 14. Each side wall portion is provided with an inner panel 34 extending from the score line 32, and a narrow bottom panel 36 is connected to the inner panel 34 along a second score line 38 for folding. An outer panel 40 is connected to the bottom panel 36 along a third score line 42 for folding, and a narrow top panel 44 is connected to the outer panel 40 along score line 46 for folding. Further, a tuck-in panel 48 is connected to the top panel 44 along score line 50 for folding. It is noted that the top and bottom panels are relatively narrow and are of substantially the same width. Also, the outer and tuck-in panels are of substantially the same width, and they both are of substantially less width than the inner panel so that the inner panel extends thereabove when the device is in its set-up position. Still referring to FIG. 3, the front wall 12 is provided with end panels 52 at each end thereof. These panels are each connected to the end edge of the outer panel 40 along score line 54 for folding, and tuck-in tab 56 is connected to the end edge of the end panel 52 along score line 58, also for folding.

Refering next to FIG. 4, there is illustrated a ruler member 10 in its collapsed condition, ready for shipment. It will be appreciated that it is in a flattened condition, and hence consumes a minimum of space during transit or storage. On each side wall the bottom panel 36 has been folded perpendicular to the inner panel 34 along fold line 38 and the outer panel 40 has been folded perpendicularly to the bottom panel 36 along fold line 42. The top panel 44 has been folded perpendicular to the outer panel 40 along fold line 46 and the tuck-in panel 48 has been folded perpendicular to the top panel 44 along fold line 50 so that the tuck-in panels are disposed in face to face relationship with respect to the inner panels 34, respectively, and are permanently adhered thereto. Interposed between the outer panel 40 and the tuck-in panel 48 is a reinforcing sheet 60 which serves to stiffen and reinforce the ruler member 10. This reinforcing sheet may comprise, as best seen in FIG. 5, a facing ply 62, a corrugated ply 64, an inner ply 66, a second corrugated ply 68 and a second facing ply 70, for example. Other suitable types of reinforcing sheets may be employed, if desired.

As best seen in FIGS. 5 and 6, it is a relatively simple procedure for the ultimate user to set up the teaching device for use. That is, the ruler member 10 is folded along the fold line 32 to provide a triangular shaped structure having front and rear walls 12 and 14. It is noted that due to the nature of the paperboard, the folding of the device along the fold line 32 introduces a resiliency so that when it is completely set up it is rigid and firm. Then, the end panel 52 is folded along the fold line 54 provided for the purpose. Also tuck-in tab 56 is folded along the fold line 58 so that the tuck-in tab 56 may be inserted between the outer panel 40 and the reinforcing sheet 60, as seen in FIG. 6. The same operation is repeated at both ends of the ruler member and, hence, it is seen that a rigid, stable structure is provided which is ready to receive the discs 18, as seen in FIG. 1.

As seen in FIG. 8, the discs 18 are provided with centrally disposed holes 62 so that they may be stacked and secured in position by means of pin 64, for convenience in storage or shipment.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A device for comparing mathematical relationships of the class described, the combination comprising a ruler member having angularly disposed side walls with a longitudinally extending ledge interposed between the top and the bottom of the side wall for receiving discs that may be rotated thereon, said discs being engageable with said side walls respectively for rendering said discs self-supporting in any preselected position and said ledge, and the lower edges of said side walls being in spaced relationship one with respect to the other for rendering said device self-standing.

2. A device according to claim 1 further comprising a plurality of discs preselected diameters.

3. A device according to claim 1 wherein the portion of at least one of said side walls below said ledge is divided into a plurality of spaces by indicia thereon, said indicia extending onto said longitudinal ledge.

4. A device according to claim 3 wherein the indicia on one side wall is in the English system and the indicia on the other side wall is in the metric system.

5. A device for comparing mathematical relationships of the class described, the combination comprising a ruler member having angularly disposed side walls with a longitudinally extending ledge for receiving discs that may be rotated thereon, each of said side walls being formed by an angularly disposed inner panel, a horizontal bottom panel foldably connected to said inner panel along a side edge, an outer panel parallel to said inner panel and foldably connected to said bottom panel along a side edge, said outer panel being of substantially less width than said inner panel to expose an upper portion of said inner panel, a top panel substantially parallel to said bottom panel and foldably connected to said outer panel along a side edge, said top panel forming said ledge, and end panel foldably connected to one end edge of said outer panel, a tuck-in flap foldably connected to the end edge of said end panel, said tuck-in flap being tucked in adjacent the outer panel of the opposite side wall at the end of said device, a tuck-in panel foldably connected to said top panel along a side edge, said tuck-in panel and said inner panel being disposed in face to face relationship and being adhered to each other.

6. A device according to claim 5 wherein said bottom and top panels are of substantially less width than said outer panel.

7. A device according to claim 5 further comprising a reinforcing sheet interposed between said tuck-in panel and said outer panel.

8. A blank for forming a teaching device comprising a sheet of paperboard or the like semi-rigid sheet material having a substantially centrally disposed first score line for folding the blank to provide corresponding opposite side wall portions thereof, each side wall portion having an inner panel extending from said first score line, a bottom panel connected to said inner panel along a second score line fold folding, an outer panel connected to said bottom panel along a third score line for folding, a top panel connected to said outer panel by a fourth score line for folding, a tuck-in panel connected to said top panel along a fifth score line for folding, said tuck-in panel and sadi outer panel being of substantially the same width, and stop and bottom panels being of substantially the same width, said outer panel being of substantially less width than said inner panel, an end panel connected to the end edge of one of said outer panels along a score line for folding, and a tuck-in tab connected to the end edge of said end panel along a score line for folding.

9. A blank according to claim 8 wherein said top and bottom panels are of substantially less width than said outer panel.

10. A collapsed device for comparing mathematical relationships of the class described, said device comprising a sheet of paperboard or the like semi-rigid sheet material having a substantially centrally disposed first score line for folding the blank to provide corresponding opposed side wall portions thereof, each side wall portion having an inner panel extending from said first score line, a bottom panel foldably connected to said inner panel along a side edge, an outer panel foldably connected to said bottom panel along a side edge, a top panel foldably connected to said outer panel along a side edge, a tuck-in panel foldably connected to said top panel along a side edge, said tuck-in panel and said inner panel being disposed in face to face relationship and being adhered to each other, a reinforcing sheet interposed between said tuck-in panel and said outer panel, and indicia disposed on the exposed surfaces of one side of the device.

11. A collapsed device according to claim 10 further comprising an end panel connected to each end edge of one of said outer panels along score lines for folding, respectively, a tuck-in tab connected to the end edge of each end panel along a second score line for folding.

References Cited

UNITED STATES PATENTS

| | | | |
|---|---|---|---|
| 3,097,444 | 7/1963 | Steiner | 248—459 X |
| 3,204,344 | 9/1965 | McMeen | 35—31.1 |
| 3,384,975 | 5/1968 | Savin et al. | 33—34 |

LAWRENCE CHARLES, Primary Examiner